United States Patent
Kani et al.

(10) Patent No.: US 8,313,869 B2
(45) Date of Patent: Nov. 20, 2012

(54) FUEL CELL POWER GENERATING SYSTEM AND FUEL CELL POWER GENERATING SYSTEM OPERATING METHOD

(75) Inventors: Yukimune Kani, Osaka (JP); Kunihiro Ukai, Nara (JP); Akira Maenishi, Osaka (JP)

(73) Assignee: Panasonic Corporation, Osaka (JP)

(*) Notice: Subject to any disclaimer, the term of this patent is extended or adjusted under 35 U.S.C. 154(b) by 283 days.

(21) Appl. No.: 12/676,456

(22) PCT Filed: Aug. 25, 2008

(86) PCT No.: PCT/JP2008/002290
§ 371 (c)(1),
(2), (4) Date: Mar. 4, 2010

(87) PCT Pub. No.: WO2009/031271
PCT Pub. Date: Mar. 12, 2009

(65) Prior Publication Data
US 2010/0203406 A1    Aug. 12, 2010

(30) Foreign Application Priority Data

Sep. 6, 2007 (JP) .................................. 2007-231615

(51) Int. Cl.
*H01M 8/06* (2006.01)
(52) U.S. Cl. ............... 429/410; 429/423; 429/443
(58) Field of Classification Search .................. None
See application file for complete search history.

(56) References Cited

U.S. PATENT DOCUMENTS 3,466,138 A    9/1969 Spiegler et al.
5,980,846 A *  11/1999 Tatani et al. .............. 423/230
(Continued)

FOREIGN PATENT DOCUMENTS

GB    2 259 871    3/1993
(Continued)

OTHER PUBLICATIONS

Extended European Search Report for Application No. 08790494.2 dated Oct. 12, 2011.
(Continued)

*Primary Examiner* — Cynthia Lee
(74) *Attorney, Agent, or Firm* — Renner, Otto, Boisselle & Sklar, LLP (57) ABSTRACT

A fuel cell power generation system 100 includes a mechanism for detachably holding an adsorptive desulfurization section 5 for adsorbing a sulfur component in a hydrocarbon-based raw material; a reformer for generating hydrogen-containing gas from the raw material which has passed the adsorptive desulfurization section 5; a fuel cell 8 for generating power using the hydrogen-containing gas as a fuel; a raw material supply section 4 for controlling a flow rate of the raw material to be supplied to the adsorptive desulfurization section 5; and an operating control section 16 for controlling a behavior of the raw material supply section 4 and a behavior of the fuel cell 8. When the adsorptive desulfurization section 5 is detected to have been exchanged, the operating control section 16 controls at least one of the behavior of the raw material supply section 4 and the behavior of the fuel cell 8, such that a ratio of the flow rate with respect to a target value for power generation by the fuel cell 8 is temporarily higher than the ratio of the flow rate with respect to the target value for the power generation before the exchange.

12 Claims, 4 Drawing Sheets

U.S. PATENT DOCUMENTS

| | | |
|---|---|---|
| 6,579,347 B1 | 6/2003 | Wakita et al. |
| 7,074,375 B2 | 7/2006 | Lampert et al. |
| 7,128,768 B2 | 10/2006 | Liu et al. |
| 8,227,133 B2 | 7/2012 | Oshikawa et al. |
| 2004/0013917 A1 | 1/2004 | Ukai et al. |
| 2006/0166056 A1 | 7/2006 | Nakamura et al. |
| 2007/0093385 A1 | 4/2007 | Kim et al. |

FOREIGN PATENT DOCUMENTS

| | | |
|---|---|---|
| JP | 09-320622 | 12/1997 |
| JP | 10-237473 | 9/1998 |
| JP | 11-309329 | 11/1999 |
| JP | 2002-358992 | 12/2002 |
| JP | 2003-243005 | 8/2003 |
| JP | 2004-228016 | 8/2004 |
| JP | 2006-008459 | 1/2006 |
| JP | 2006-137649 | 6/2006 |
| JP | 2006-278120 | 10/2006 |
| JP | 2006-286279 | 10/2006 |
| JP | 2007-123269 | 5/2007 |
| JP | 2007-141857 | 6/2007 |
| JP | 2007-194142 | 8/2007 |
| JP | 2008-074674 | 4/2008 |
| WO | 2007/091632 A1 | 8/2007 |
| WO | 2007/148699 A1 | 12/2007 |
| WO | 2009/004803 A1 | 1/2009 |
| WO | 2009/031271 A1 | 3/2009 |

OTHER PUBLICATIONS

Extended European Search Report for Application No. 08790137.7 dated Oct. 21, 2011.

International Search Report for corresponding application No. PCT/JP2008/002290 mailed Nov. 25, 2008.

International Search Report for Application No. PCT/JP2008/001738 mailed Sep. 30, 2008.

International Search Report for Application No. PCT/JP2008/002534 mailed Sep. 8, 2009.

Co-pending U.S. Appl. No. 12/665,152 submitted on Dec. 17, 2009.

Co-pending U.S. Appl. No. 12/671,766 submitted on Feb. 2, 2010.

Office Action for co-pending U.S. Appl. No. 12/665,152 mailed Jul. 25, 2012.

* cited by examiner

FUEL CELL POWER GENERATING SYSTEM AND FUEL CELL POWER GENERATING SYSTEM OPERATING METHOD

TECHNICAL FIELD

The present invention relates to a fuel cell power generation system and a method for operating the same.

BACKGROUND ART

Fuel cells capable of power generation at a high efficiency even with a small size are being progressively developed as a key component of a power generation system for a distributed energy supply source. A supply system of hydrogen gas, which is a fuel necessary for power generation, is not sufficiently provided as a general infrastructure. Therefore, a reformer for generating hydrogen-containing gas using a raw material (hydrocarbon-based gas) supplied from an existing fossil raw material infrastructure such as, for example, city gas, propane gas or the like is provided with a fuel cell.

Hydrocarbon-based gas such as city gas, propane gas or the like which is supplied from an existing infrastructure usually contains an odorant such as a sulfur compound, for example, $CH_3SCH_3$ or $(CH_3)_3CSH$, at a volume concentration of about several ppm's. Such an odorant is added in order to detect a gas leak from a pipe or the like of the infrastructure line. However, a sulfur compound contained in such gas as an odorant poisons catalysts used in the reformer. Accordingly, in order to suppress the poisoning influence of sulfur on the catalyst, the sulfur compound needs to be removed from the raw material such as city gas, propane gas or the like before the raw material is supplied to the reformer.

Patent Document No. 1 proposes adsorbing a sulfur compound in the raw material by an adsorptive desulfurization section using a zeolite-based adsorptive removal agent in order to remove the sulfur compound from the raw material before the raw material is supplied to the reformer.

With an adsorptive desulfurization section using a zeolite-based adsorptive removal agent, the adsorbing capacity on a sulfur compound is small. In order to sufficiently suppress the poisoning influence of sulfur on the catalyst used in the reformer, the adsorptive desulfurization section needs to be exchanged every certain time period. For example, Patent Document No. 2 filed by the present Applicant describes using a detachable adsorptive desulfurization section in a fuel cell power generation system and proposes determining the time to exchange the adsorptive desulfurization section based on an accumulated amount of the raw material gas which has passed the section. Patent Document No. 3 proposes a method of networking a plurality of fuel cell power generation systems installed at houses and facilities to determine the time to exchange the adsorptive desulfurization section.

Patent Document No. 1: Japanese Laid-Open Patent Publication No. 2004-228016
Patent Document No. 2: Japanese Laid-Open Patent Publication No. 2006-8459
Patent Document No. 3: Japanese Laid-Open Patent Publication No. 2006-278120

DISCLOSURE OF THE INVENTION

Problems to be Solved by the Invention

When a hydrocarbon-based raw material such as propane gas, city gas or the like (hereinafter, also referred to simply as a "raw material") is caused to pass an adsorptive desulfurization section using a zeolite-based adsorptive removal agent, the zeolite-based adsorptive removal agent adsorbs a hydrocarbon component in addition to a sulfur component (including a sulfur compound) in the raw material. Especially, the adsorbing ratio, on the hydrocarbon component, of a fresh adsorptive desulfurization section which has been passed by almost no raw material is high. As the accumulated amount of the raw material which has passed the adsorptive desulfurization section (flow volume) increases, the adsorbing ratio on the hydrocarbon component decreases. When the amount of the hydrocarbon component adsorbed by the adsorptive desulfurization section reaches a prescribed amount (saturation), the adsorptive desulfurization section adsorbs almost no more hydrocarbon component. Therefore, when the fuel cell power generation system is operated immediately after the adsorptive desulfurization section which has been used is exchanged for a fresh adsorptive desulfurization section, the fresh adsorptive desulfurization section adsorbs a part of the hydrocarbon component in the raw material. Where the fuel cell power generation system is kept operated with no consideration of such adsorption, the amount of hydrogen-containing gas generated in the reformer becomes smaller than that before the adsorptive desulfurization section is exchanged. For this reason, there is an undesirable possibility that the amount of power which needs to be generated may not be generated.

The reformer usually includes a heating source for causing a reforming reaction. Hydrogen off-gas is occasionally used for the heating source. "Hydrogen off-gas" refers to hydrogen gas which is supplied to the fuel cell but is not consumed by the fuel cell and thus is discharged. In the above case, when the generation amount of the hydrogen-containing gas decreases due to the adsorption of the hydrocarbon component by the adsorptive desulfurization section, the amount of hydrogen gas supplied to the fuel cell also decreases. As a result, the amount of hydrogen off-gas usable as a heating source of the reformer also decreases. Therefore, there is a possibility that the amount of heat necessary for the reforming reaction may not be obtained.

This causes a problem that the fuel cell power generation system cannot be kept operated normally after the adsorptive desulfurization section is exchanged.

The present invention made in light of the above-described situation has an object of providing a fuel cell power generation system using a detachable adsorptive desulfurization section, which can be stably operated even immediately after the adsorptive desulfurization section is exchanged.

Means for Solving the Problems

A fuel cell power generation system according to the present invention includes a mechanism for detachably holding an adsorptive desulfurization section for allowing a hydrocarbon-based raw material containing a sulfur component to pass therethrough and adsorbing the sulfur component in the raw material; a reformer for generating hydrogen-containing gas from the raw material which has passed the adsorptive desulfurization section; a fuel cell for generating power using the hydrogen-containing gas as a fuel; a raw material supply section for controlling a flow rate of the raw material to be supplied to the adsorptive desulfurization section; and an operating control section for controlling a behavior of the raw material supply section and a behavior of the fuel cell. When the adsorptive desulfurization section is detected to have been exchanged, the operating control section controls at least one of the behavior of the raw material supply section and the behavior of the fuel cell, such that a ratio of the flow rate with respect to a target value for power generation by the fuel cell is temporarily higher than the ratio of the flow rate with respect to the target value for the power generation before the exchange.

In a preferable embodiment, the fuel cell power generation system further includes an accumulated flow volume measuring section for measuring an accumulated flow volume of the raw material supplied to the adsorptive desulfurization section. When the adsorptive desulfurization section is detected to have been exchanged, the operating control section controls a behavior of the accumulated flow volume measuring section to start measuring the accumulated flow volume of the raw material; and when the accumulated flow volume measured by the accumulated flow volume measuring section reaches a preset level, the operating control section controls at least one of the behavior of the raw material supply section and the behavior of the fuel cell, such that the ratio of the flow rate with respect to the target value for the power generation is returned to the ratio before the exchange.

In a preferable embodiment, the fuel cell power generation system further includes an accumulated power generation amount measuring section for measuring an accumulated power generation amount by the fuel cell. When the adsorptive desulfurization section is detected to have been exchanged, the operating control section controls a behavior of the accumulated power generation amount measuring section to start measuring the accumulated power generation amount; and when the accumulated power generation amount measured by the accumulated power generation amount measuring section reaches a preset level, the operating control section controls at least one of the behavior of the raw material supply section and the behavior of the fuel cell, such that the ratio of the flow rate with respect to the target value for the power generation is returned to the ratio before the exchange.

It is preferable that the preset level is determined based on a flow volume of the raw material which is necessary to saturate an adsorbing amount of the adsorptive desulfurization section on hydrocarbon.

In a preferable embodiment, the operating control section controls the behavior of the raw material supply section, such that the flow rate after the adsorptive desulfurization section is exchanged is increased as compared with the flow rate before the exchange.

The flow rate to be increased may be determined based on an adsorption characteristics of the adsorptive desulfurization section on a hydrocarbon component and the accumulated flow volume of the raw material.

The flow rate before the exchange may be controlled to be changed in accordance with a predefined program after the fuel cell power generation system starts its start-up process.

In a preferable embodiment, when the adsorptive desulfurization section is detected to have been exchanged, the operating control section controls the behavior of the fuel cell such that the target value for the power generation is lower than the target value before the exchange.

When the adsorptive desulfurization section is detected to have been exchanged, the operating control section may control an amount of an electric current obtained from the fuel cell, such that the target value for the power generation is lower than the target value before the exchange.

The operating control section may control at least one of the behavior of the raw material supply section and the behavior of the fuel cell, such that the ratio of the flow rate with respect to the target value for the power generation after the exchange of the adsorptive desulfurization section is returned to the ratio before the exchange step by step.

The fuel cell power generation system further includes an exchange signal output section for outputting an exchange signal regarding the adsorptive desulfurization section. The operating control section may detect that the adsorptive desulfurization section has been exchanged based on the exchange signal.

It is preferable that the adsorptive desulfurization section has an adsorptive removal agent containing zeolite as a main component.

A method for operating a fuel cell power generation system according to the present invention is a method for operating a fuel cell power generation system using a fuel cell, by which a hydrocarbon-based raw material containing a sulfur component is introduced into an adsorptive desulfurization section for adsorbing the sulfur component in the raw material, then hydrogen-containing gas is generated by a reforming reaction of the raw material which has passed the adsorptive desulfurization section and water, and power generation is performed using the hydrogen-containing gas as a fuel. The raw material is introduced into the adsorptive desulfurization section at a flow rate corrected based on an adsorbing ratio of the adsorptive desulfurization section on a hydrocarbon component.

Another method for operating a fuel cell power generation system according to the present invention is a method for operating a fuel cell power generation system using a fuel cell, by which a hydrocarbon-based raw material containing a sulfur component is introduced into an adsorptive desulfurization section for adsorbing the sulfur component in the raw material, then hydrogen-containing gas is generated by a reforming reaction of the raw material which has passed the adsorptive desulfurization section and water, and power generation is performed using the hydrogen-containing gas as a fuel. The power generation is performed by the fuel cell at a power corrected based on an adsorbing ratio of the adsorptive desulfurization section on a hydrocarbon component.

Effects of the Invention

According to the present invention, even immediately after the adsorptive desulfurization section is exchanged, an amount of hydrogen-containing gas necessary to generate a set amount of power is obtained with certainty, as before the exchange of the adsorptive desulfurization section. Therefore, the fuel cell power generation system can be operated stably, and thus the reliability thereof can be improved.

According to a method for operating a fuel cell power generation system of the present invention, the flow rate of the raw material to be introduced into the adsorptive desulfurization section or the amount of power to be generated by the fuel cell is controlled based on the adsorbing ratio of the adsorptive desulfurization section on the hydrocarbon component. Therefore, the adsorptive desulfurization section can be continuously operated stably regardless of the adsorbing ratio of the adsorptive desulfurization section on the hydrocarbon component.

DESCRIPTION OF THE REFERENCE NUMERALS

| | |
|---|---|
| 2 | Combustion section |
| 3 | Water supply section |
| 4 | Raw material supply section |
| 5 | Adsorptive desulfurization section |
| 6 | Gas infrastructure line |
| 7 | Connection section |
| 8 | Fuel cell |
| 9 | Gas switching section |
| 10 | Raw material supply path |
| 11 | Reformer bypass path |
| 12 | Hydrogen gas supply path |
| 13 | Fuel cell bypass path |
| 14 | Off-gas path |
| 15 | Combustion gas supply path |
| 16 | Operating control section |
| 17 | Input section |
| 18 | Combustion fan |
| 19 | Air supply section |
| 30 | Reformer |

BEST MODE FOR CARRYING OUT THE INVENTION

In order to examine the above problems caused by the exchange of an adsorptive desulfurization section, the present inventors measured an adsorption characteristics of a fresh adsorptive desulfurization section. The method and results of the measurement will be described.

The measurement was carried out using an adsorptive desulfurization section filled with a zeolite-based adsorptive desulfurization agent which had not contacted the raw material almost at all. The amount of the adsorptive desulfurization agent to be put into the adsorptive desulfurization section was about 400 g (weight in a dried state). As a raw material to pass the adsorptive desulfurization section, city gas 13A supplied from a gas infrastructure line 6 of Osaka Gas Co., Ltd. was used. Table 1 shows the composition of 13A of Osaka Gas Co., Ltd. used in this measurement (see MSDS provided by Osaka Gas Co., Ltd.).

TABLE 1

| Component | Volume % |
|---|---|
| Methane | 88.9 |
| Ethane | 6.8 |
| Propane | 3.1 |
| Butane | 1.2 |

This adsorptive desulfurization section was set in a fuel cell power generation system as described later, and the target value for the power generation by the fuel cell was set to 1 kW or the vicinity thereof. The above-described raw material was distributed in the adsorptive desulfurization section at 4 L/min. (20° C.; converted into the value at 1 atmospheric pressure), which is the flow rate of 13A necessary for power generation of 1 kW or the vicinity thereof. On this stage, the flow rate of the raw material before the raw material passed the adsorptive desulfurization section (entrance-side flow rate) and the flow rate of the raw material after the raw material passed the adsorptive desulfurization section (exit-side flow rate) were measured, and the ratio of the exit-side flow rate with respect to the entrance-side flow rate (hereinafter, referred to simply as a "flow rate ratio") was found.

Figure 1:
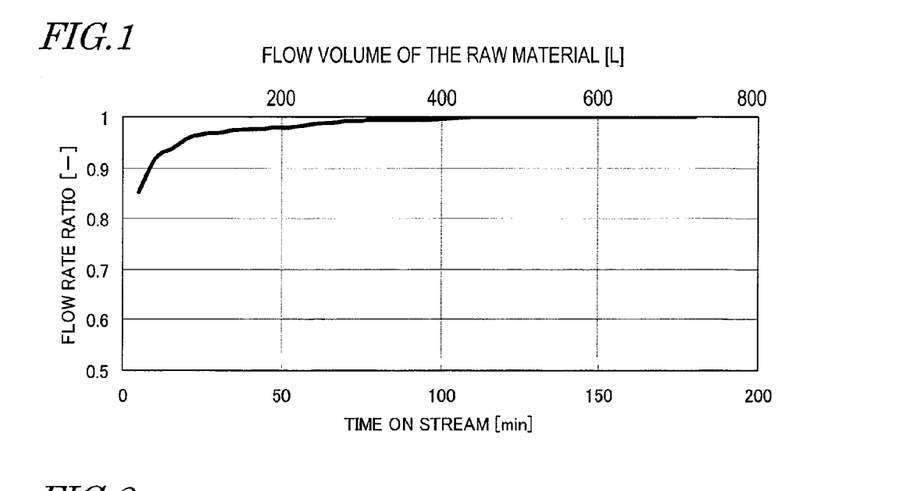
FIG. 1 is a graph showing measurement results of the flow rate ratio between at an entrance and at an exit of a fresh adsorptive desulfurization section.

The measurement results are shown in FIG. 1. FIG. 1 is a graph showing the change of the flow rate ratio with respect to the time on stream or the flow volume of the raw material (accumulated flow volume). As understood from the results, when the system starts to be operated immediately after the adsorptive desulfurization section is exchanged, a part of the hydrocarbon component in the raw material is adsorbed by the adsorptive desulfurization section. Thus, the flow rate of the raw material after the raw material passes the adsorptive desulfurization section (exit-side flow rate) is lower than the flow rate of the raw material before the raw material passes the adsorptive desulfurization section (entrance-side flow rate). Therefore, the flow rate ratio (exit-side flow rate/entrance-side flow rate) is lower than 1. In the fuel cell power generation system, the raw material which has passed the adsorptive desulfurization section is supplied to a reformer, and hydrogen-containing gas is generated in the reformer. Accordingly, when the flow rate ratio is lower than 1, the amount of the hydrogen-containing gas generated in the reformer is smaller than the amount generated in the case where hydrocarbon is not adsorbed (flow rate ratio=1).

As shown in FIG. 1, as the accumulated amount of the raw material which passed the adsorptive desulfurization section increases, the flow rate ratio gradually becomes closer to 1. This means that as the accumulated flow volume of the raw material increases, the amount of the hydrocarbon component in the raw material which is adsorbed by the adsorptive desulfurization section decreases. When the accumulated flow volume further increases and reaches a prescribed amount, the flow rate ratio becomes about 1. This is considered to occur because the amount of the hydrocarbon component adsorbable by the adsorptive desulfurization section is saturated. In this specification, the accumulated flow volume necessary to saturate such an adsorption amount of the hydrocarbon component is referred to as an "flow volume for saturation adsorption". From the above measurement results, it is understood that the flow volume for saturation adsorption of the adsorptive desulfurization section used here is, for example, about 700 L.

Next, the present inventors performed qualitative and quantitative analyses on the raw material which passed the adsorptive desulfurization section. The adsorptive desulfurization section was substantially the same as that used in the above-described measurement. The method and results of the analyses will be described.

First, an analysis was made on the raw material which had not passed the adsorptive desulfurization section (pre-desulfurization raw material sample) N0. Then, the raw material was caused to pass the adsorptive desulfurization section at substantially the same flow rate as that described above. Each time when the accumulated flow volume of the raw material which passed the adsorptive desulfurization section reached 240 L, 480 L and 720 L, an analysis was made on the respective raw material which passed the adsorptive desulfurization section (post-desulfurization raw material samples) N1, N2, N3. The quantitative analysis on the pre-desulfurization raw material sample N0 and the post-desulfurization raw material samples N1 through N3 was made using gas chromatography after sampling the raw materials. The analysis on the components of these raw material samples (qualitative analysis) was made by substantially the same method as inflammable gas component analysis of city gas generally used, and so the method will not be described.

Figure 2:
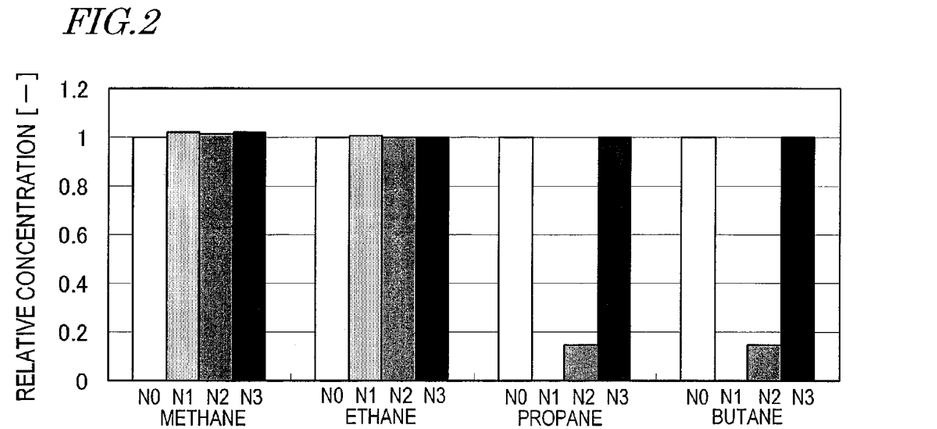
FIG. 2 is a graph showing measurement results of the composition of a raw material before and after the raw material passes the fresh adsorptive desulfurization section.

The analysis results are shown in FIG. 2. FIG. 2 is a graph showing relative concentrations of hydrocarbon (methane, ethane, propane and butane) contained in the pre-desulfurization raw material sample N0 and the post-desulfurization raw material samples N1 through N3. The "relative concentration" is a ratio of the concentration of the hydrocarbon contained in each raw material sample with respect to the concentration of the hydrocarbon contained in the pre-desulfurization raw material sample N0.

From the measurement results shown in FIG. 2, it is understood that the adsorption amount of methane, which is a main component of city gas, is saturated immediately after the raw material starts passing the adsorptive desulfurization section, whereas the adsorption amounts of propane and butane which contain a larger number of carbon atoms in the molecules are saturated after a certain amount of raw material passes the adsorptive desulfurization section.

By comparing the results of the two measurements described above (FIG. 1 and FIG. 2), the following is confirmed. When the raw material passes the adsorptive desulfurization section until the accumulated flow volume reaches 240 L, as shown in FIG. 1, the gas flow rate ratio is about 0.96 (data with the time on stream of 60 min.). This indicates that about 4% of the amount of the raw material before the raw material passes the adsorptive desulfurization section is adsorbed. By contrast, when the accumulated flow volume reaches 240 L, as shown in FIG. 2, almost all the amounts of propane and butane in the raw material are adsorbed by the adsorptive desulfurization section. As shown in Table 1, a sum of the components of propane and butane is 4.3% on the volume basis. Therefore, it is understood that when the accumulated flow volume reaches 240 L, almost all the amounts of propane and butane in the raw material are adsorbed by the adsorptive desulfurization section, and the flow rate of the raw material decreases by the corresponding volume. Thus, the measurement results shown in FIG. 1 and FIG. 2 match Table 1 showing the components.

As described above, in the case where a fresh adsorptive desulfurization section is set in the fuel cell power generation system, when the system starts to be operated, a part of the hydrocarbon component in the raw material is adsorbed by the adsorptive desulfurization section. Therefore, the flow rate of the raw material N1 which has passed the adsorptive desulfurization section is lower than the flow rate of the raw material N0 which has not passed the adsorptive desulfurization section. When a further amount of raw material passes the adsorptive desulfurization section, the adsorption amounts of the hydrocarbon components are saturated in the order from an adsorption amount of a hydrocarbon component having a smaller number of carbon atoms in the molecules. Thus, as shown in FIG. 1, the adsorption amount decreases and the flow rate ratio approaches 1. However, the components having 2 or more carbon atoms (ethane, propane, butane) each generate a larger amount of hydrogen than methane for the same volume. Therefore, when such a component is adsorbed, the generation amount of hydrogen-containing gas decreases by a volume more than the volume decreased by the adsorption. For example, where the accumulated flow volume is 240 L, the volume of the raw material decreases by about 4% as described above. This corresponds to a decrease of about 10% when being converted on the volume basis to the amount of hydrogen gas which can be generated. Accordingly, power generation is performed by the fuel cell in the state where the amount of power to be generated is set based on the flow rate of the raw material before the raw material passes the adsorptive desulfurization section, the actual generation amount of hydrogen gas is smaller than the amount of hydrogen required by the fuel cell. As a result, as understood from this, the power generation state becomes unstable, or the amount of the hydrogen off-gas supplied to a combustion section of the reformer decreases and so an amount of heat necessary for the reforming reaction cannot be supplied.

The present invention is made based on the above-described measurement results and the examination results, and is characterized in that the ratio of the flow rate of the raw material to be supplied to the adsorptive desulfurization section and the target value for the power generation is controlled in consideration of the amount, of the hydrocarbon component contained in the raw material, which will be adsorbed by the adsorptive desulfurization section. Owing to this, an amount of hydrogen-containing gas necessary for the power generation can be obtained with more certainty even after the adsorptive desulfurization section is exchanged.

A fuel cell power generation system in a preferable embodiment according to the present invention performs power generation using a hydrocarbon-based raw material containing a sulfur component, and uses an adsorptive desulfurization section for adsorbing the sulfur component in order to remove the sulfur component from the raw material. The adsorptive desulfurization section is detachably held by a holding mechanism provided in the fuel cell power generation system. When the adsorbing ability of the adsorptive desulfurization section on the sulfur component is decreased, the adsorptive desulfurization section is exchanged for a new one as necessary. It is preferable that the adsorptive desulfurization section has an adsorptive desulfurization agent containing zeolite as a main component. A zeolite-based adsorptive desulfurization agent allows desulfurization to be performed at room temperature, is easy to handle, and is easy to exchange.

This fuel cell power generation system includes a reformer for generating hydrogen-containing gas using a raw material which has passed an adsorptive desulfurization section; a fuel cell for generating power using the hydrogen-containing gas as a fuel; a raw material supply section for controlling a flow rate of the raw material (hereinafter, also referred to simply as a "raw material flow rate") to be supplied to the adsorptive desulfurization section; and an operating control section. When the adsorptive desulfurization section is detected to have been exchanged, the operating control section controls at least one of a behavior of the raw material supply section and a behavior of the fuel cell, such that a ratio of the raw material flow rate with respect to a target value for power generation by the fuel cell is temporarily higher than the ratio of the flow rate with respect to the target value for the power generation before the exchange.

In this specification, the "ratio of the raw material flow rate and the target value for the power generation" means the ratio of the raw material flow rate with respect to the target value for the power generation. For example, when the target value for the power generation is 1 kW (also referred to simply as "for power generation of 1 kW") and the raw material flow rate necessary to obtain an output of 1 kW is 4 NL/min. (0° C.; converted into the value at 1 atmospheric pressure), the "ratio of the raw material flow rate and the target value for the power generation" is 4 NL/(min·kW). The above-mentioned ratio may be any value which shows the relationship between the raw material flow rate and the target value for the power generation on a certain basis. For example, the ratio between the raw material flow rate and the target value for the power generation which is converted into a value of energy may be used. In this case, the unit of the ratio can be dimensionless.

According to the above-described fuel cell power generation system, during a certain time period after the adsorptive desulfurization section is exchanged, namely, while the adsorptive desulfurization section adsorbs a non-ignorable amount of hydrocarbon component in addition to the sulfur component, the ratio of the raw material flow rate with respect to the target value for the power generation is made higher than that before the adsorptive desulfurization section is exchanged (hereinafter, referred to as "in the normal state"). Therefore, a sufficient amount of hydrocarbon component can be stably supplied to the reformer, and thus an amount of hydrogen-containing gas necessary to obtain the target value for the power generation can be obtained with certainty. This can decrease the change of the generated power amount, which occurs due to the shortage of hydrogen, as compared to by the conventional art. In order to increase the ratio, the raw material flow rate may be increased, or the target value for the power generation may be decreased. Or, both of these measures can be taken.

The timing to return the ratio of the raw material flow rate with respect to the target value for the power generation to the ratio in the normal state varies in accordance with the adsorption characteristics, on the hydrocarbon component, of the adsorptive desulfurization section to be used in the system and also in accordance with the operating conditions of the system (raw material flow rate in the normal state, amount of power generation, etc.). For example, the fuel cell power generation system may be controlled such that when the accumulated flow volume of the raw material supplied to the adsorptive desulfurization section reaches a preset level, the raw material flow rate or the target value for the power generation is returned to the level in the normal state. Alternatively, the fuel cell power generation system may be controlled such that when the accumulated amount of power generated by the fuel cell reaches a preset level, the raw material flow rate or the target value for the power generation is returned to the level in the normal state. Still alternatively, a time period from the start of the operation until the raw material flow rate or the target value for the power generation is to be returned to the level in the normal state may be preset. In either case, the "preset level (time period)" may be set based on the flow volume of the raw material necessary to saturate the adsorption amount of the hydrocarbon component (flow volume for saturation adsorption). The flow volume for saturation adsorption varies in accordance with the type or amount of the adsorbing agent contained in the adsorptive desulfurization section. Thus, the flow volume for saturation adsorption can be found by the measurement result of the adsorbing ratio, on the hydrocarbon component, of the adsorptive desulfurization section to be used. The adsorbing ratio on the hydrocarbon component may be obtained by measuring the relationship between the flow volume of the raw material through the adsorptive desulfurization section and the ratio of the exit-side flow rate with respect to the entrance-side flow rate (flow rate ratio) by substantially the same method as described above.

The ratio by which the raw material flow rate is to be increased, or the ratio by which the amount of power generation is to be decreased, during the operation after the exchange of the adsorptive desulfurization section may be determined based on the adsorbing ratio of the adsorptive desulfurization section on the hydrocarbon component. Herein, the "ratio by which the raw material flow rate is to be increased" is the ratio of the amount of the raw material flow rate to be increased, with respect to the raw material flow rate in the normal state. The "ratio by which the amount of power generation is to be decreased" is the ratio of the amount of the target value for the power generation to be decreased, with respect to the target value for the power generation in the normal state. Owing to this, the raw material flow rate or the target value for the power generation can be corrected more precisely in accordance with the amount of the hydrocarbon component adsorbed by the adsorptive desulfurization section. Accordingly, the following can be effectively prevented: the generation amount of the hydrogen-containing gas is too small for the target value for the power generation, and thus the target amount of power cannot be generated; or on the contrary, the generation amount of the hydrogen-containing gas is too large, and hydrogen of an amount larger than necessary to generate the target amount of power is consumed, as a result of which the operation under conditions of a low energy efficiency is prevented.

The ratio by which the raw material flow rate is to be increased, or the ratio by which the amount of power generation is to be decreased, may be varied in accordance with the accumulated flow volume of the raw material which has passed the adsorptive desulfurization section. In this case, as the accumulated flow volume of the raw material approaches the flow volume for saturation adsorption, the ratio is decreased. The relationship between the accumulated flow volume and the ratio may be organized in the form of a table based on the measurement results of the adsorbing ratio, on the hydrocarbon component, of the adsorptive desulfurization section to be used and input to the fuel cell power generation system in advance.

A method for operating a fuel cell power generation system in a preferable embodiment according to the present invention is characterized in introducing the raw material into the adsorptive desulfurization section at a flow rate corrected based on the adsorbing ratio of the adsorptive desulfurization section on the hydrocarbon component. Also, a method for operating a fuel cell power generation system in a preferable embodiment according to the present invention is characterized in performing power generation using the fuel cell at a power corrected based on the adsorbing ratio of the adsorptive desulfurization section on the hydrocarbon component. Owing to this, the decrease of the generation amount of the hydrogen-containing gas or the output of the fuel cell, which would be otherwise caused due to the adsorption of the hydrocarbon component by the adsorptive desulfurization section, can be suppressed. Thus, the system can be operated more stably.

Hereinafter, an embodiment of the present invention will be described more specifically with reference to the drawings.

Embodiment 1

Structure of a Fuel Cell Power Generation System

Figure 3:
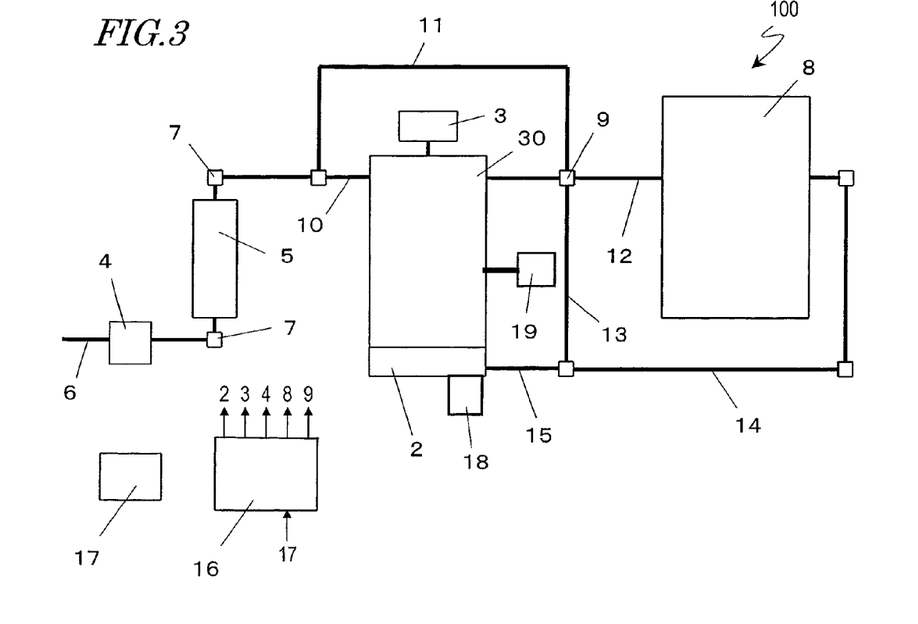
FIG. 3 is a structural view of a fuel cell power generation system in Embodiment 1 according to the present invention.

FIG. 3 is a structural view of a fuel cell power generation system in Embodiment 1 according to the present invention. The fuel cell power generation system 100 includes an adsorptive desulfurization section 5 for allowing a hydrocarbon-based raw material containing a sulfur component to pass therethrough and adsorbing the sulfur component contained in the raw material, a reformer 30 including a reforming section (also referred to as a "steam reforming section") for advancing mainly a reforming reaction of the raw material which has passed the adsorptive desulfurization section 5 and steam to generate hydrogen-containing gas, a fuel cell 8 for performing power generation using the hydrogen-containing gas supplied from the reformer 30 via a hydrogen gas supply path 12, a raw material supply section 4 for controlling the flow rate of the raw material (raw material flow rate) to be supplied to the adsorptive desulfurization section 5, and an operating control section for controlling a behavior of the raw material supply section 4 and a behavior of the fuel cell 8.

The hydrocarbon-based raw material to be supplied to the adsorptive desulfurization section 5 may be any raw material containing an organic compound formed at least of carbon and hydrogen, such as hydrocarbon or the like, and is, for example, city gas, natural gas, LPG or the like containing methane as a main component. Herein, the gas infrastructure line 6 of the city gas is used as a supply source of the raw material, and the adsorptive desulfurization section 5 is connected to the gas infrastructure line 6. The adsorptive desulfurization section 5 has a shape detachable from connection sections 7 which are located upstream and downstream with respect to the adsorptive desulfurization section 5. When the amount of the sulfur component adsorbable by the adsorptive desulfurization section 5 is saturated as a result of using the adsorptive desulfurization section 5 for a certain time period and so the adsorption characteristics of the adsorptive desulfurization section 5 is declined, the adsorptive desulfurization section 5 is exchanged for a new one. The adsorptive desulfurization section 5 in this embodiment is filled with a zeolite-based adsorptive removal agent for adsorbing a sulfur compound, which is an odorizing component in the city gas.

The raw material which has passed the adsorptive desulfurization section 5 is supplied to the reformer 30 via a raw material supply path 10. The reformer 30 is connected to a water supply section 3 for supplying water to the steam reforming section of the reformer 30. The water supply section 3 in this embodiment includes a pump having a flow rate adjusting function, and supplies water collected in the fuel cell power generation system and purified by activated carbon and an ion exchange resin to the steam reforming section. The reformer 30 further includes a combustion section (burner) 2 for supplying heat of reaction necessary for the reforming reaction to the steam reforming section, and a combustion fan 18 for supplying air for combustion to the combustion section 2. Although not shown, the reformer in this embodiment includes, in addition to the steam reforming section for advancing a reforming reaction of the raw material and steam, a shift converting section for causing a shift converting reaction of carbon monoxide in the hydrogen-containing gas generated by the steam reforming section and steam to reduce the concentration of carbon monoxide in the hydrogen-containing gas, and a selective oxidation section for removing, by mainly oxidizing, carbon monoxide residual in the hydrogen-containing gas which has passed the shift converting section, using air supplied from an air supply section 19. The structures of the steam reforming section, the shift converting section and the selective oxidation section are substantially the same as general structures of such sections and will not be described in detail.

The raw material supply section 4 is provided upstream with respect to the adsorptive desulfurization section 5, and controls the flow rate of the raw material to be supplied from the gas infrastructure line 6 to the adsorptive desulfurization section 5. The raw material supply section 4 only needs to control the flow rate of the raw material to be supplied to the adsorptive desulfurization section 5, and may be located downstream with respect to the adsorptive desulfurization section 5, for example, in the raw material supply path 10 which connects the adsorptive desulfurization section 5 and the reformer 30. At this point, where the relationship between the accumulated flow volume of the raw material to pass the adsorptive desulfurization section 5 and the adsorption characteristics of the adsorptive desulfurization section 5 on the hydrocarbon component is organized in the form of a table, the amount of the raw material to be introduced into the adsorptive desulfurization section 5 can be controlled more accurately.

In this embodiment, the raw material supply section 4 includes a booster pump, and, for example, can control the electric current pulse to be input, power to be input or the like to adjust the flow rate of the raw material to be supplied to the adsorptive desulfurization section 5.

A gas switching section 9 for adjusting a gas flow is provided on the hydrogen gas supply path 12 which connects the reformer 30 and the fuel cell 8. The gas switching section 9 is connected to a reformer bypass path 11 acting as a bypass path from the raw material supply path 10. In the fuel cell 8, an off-gas path 14 for discharging hydrogen off-gas which is left unused after the power generation is provided. The off-gas path 14 is connected to a fuel cell bypass path 13 and also to a combustion gas supply path 15 which is connected to the combustion section 2. The structure of the fuel cell 8 is substantially the same as that of a generally used solid-state polymer-type fuel cell and will not be described in detail.

The operating control section 16 is a controller for controlling a behavior of the reformer 30 for generating the hydrogen-containing gas or a power generation behavior of the fuel cell 8. Herein, the operating control section 16 controls the amount of the raw material to be supplied from the raw material supply section 4 to the reformer 30, the amount of water to be supplied from the water supply section 3 to the reformer 30, the output of the fuel cell 8 and the like. The operating control section 16, using a semiconductor memory, a CPU or the like, can store the operating information and the like such as an operation sequence of the fuel cell power generation system 100, the accumulated raw material flow rate and the like, calculate an appropriate operation condition suitable to each situation, and issue an instruction on the operation condition to elements necessary for operating the system such as the water supply section 3, the raw material supply section 4 and the like. The operating control section 16 is connected to an input section 17 for inputting an instruction signal of operation to the fuel cell power generation system 100, an exchange signal regarding the adsorptive desulfurization section 5 and the like. A conventional system uses an input section for inputting an instruction signal of operation, but the input section 17 in this embodiment is usable to input an exchange signal in addition to the instruction signal of operation, unlike the input section in the conventional system. For example, the input section 17 includes a touch panel, and a maintenance worker or a user may input an instruction signal of operation or an exchange signal from the touch panel when necessary.

Although not shown, in the fuel cell power generation system 100, an exchange signal on the adsorptive desulfurization section 5 is output to the operating control section 16. The exchange signal may be output based on, for example, a signal which is input to the input section 17 by the maintenance worker of the system. Alternatively, a mechanism for holding the adsorptive desulfurization section (for example, the connection sections 7) may be provided with a desulfurization section exchange detection section (a contact switch, a sensor, etc.) for detecting an exchange of the adsorptive desulfurization section 5. When the desulfurization section exchange detection section detects an exchange, an exchange signal may be generated and output to the operating control section 16.

In this embodiment, at the time of starting up (during the start-up time period) of the reformer 30, which is one step of starting up the fuel cell power generation system, the gas switching section 9 is operated to supply the hydrogen-containing gas generated in the reformer 30 from the hydrogen gas supply path 12 to the combustion section 2 via the fuel cell bypass path 13 and the combustion gas supply path 15. After the start-up process of the reformer 30, hydrogen off-gas which is left unused after the power generation by the fuel cell 8 is supplied from the off-gas supply path 14 to the combustion section 2 of the reformer 30 via the combustion gas supply path 15. The fuel cell power generation system 100 is structured such that in the case where the raw material needs to be combusted directly in the combustion section 2, the raw material which has passed the adsorptive desulfurization section 5 can be supplied to the combustion section 2 or the fuel cell 8 via the reformer bypass path 11 without passing the reformer 30.

<Operation of the Fuel Cell Power Generation System in the Normal State>

Now, an operation on the fuel cell power generation system 100 in the normal state will be described.

For starting-up the fuel cell power generation system 100 from a stop state, first, valves and the like (the details are not shown) set on gas flow paths of the fuel cell power generation system 100 are closed where necessary to check whether or not there is a gas leak from each gas flow path or the like. When there is no gas leak, the start-up process of the reformer 30. Based on an instruction from the operating control section 16, the raw material which has passed the reformer 30 is supplied to the combustion section 2 and ignited by the combustion section 2 to start heating of the steam reforming section.

At this point, the water supply section 3 is operated to supply water to the reformer 30 and thus to start a reforming reaction of water and the raw material. In this embodiment, city gas (13A) containing methane as a main component is used as the raw material. The amount of water supplied from the water supply section 3 is controlled such that the amount of steam is about 3 mols with respect to 1 mol of the carbon atoms in the average molecular form of the city gas (steam-to-carbon ratio (S/C): about 3). The reformer 30 advances a steam reforming reaction, a shift converting reaction, and a selective oxidation reaction of carbon monoxide to generate hydrogen-containing gas having a carbon monoxide volumetric concentration reduced down to about 20 ppm.

Next, the generated hydrogen-containing gas is caused to pass the hydrogen gas supply path 12 to be supplied to the fuel cell 8, and thus the power generation operation is performed. At the time of normal power generation operation, the operating control section 16 controls the behavior of the raw material supply section 4 to supply the raw material to the reformer 30 at a preset flow rate with respect to the amount (target value) of power to be generated by the fuel cell 8, and the generated hydrogen-containing gas is supplied to the fuel cell 8.

By contrast, for stopping the power generation operation of the fuel cell power generation system 100, the supply of the raw material and water to the reformer 30 is stopped, and the temperature of a catalyst layer of each of the steam reforming section, the shift converting section and the selective oxidation section in the reformer 30 is lowered. After the temperature of each catalyst layer is lowered to a set level, the raw material is supplied to the reformer 30 and the hydrogen-containing gas staying inside the gas path of the reformer 30 is replaced with the raw material. The hydrogen-containing gas staying inside the reformer 30 and replaced at this point is passed to the combustion section 2 and combusted. The hydrogen-containing gas residual in the gas path of the fuel cell 8 is replaced with the raw material, like the hydrogen-containing gas staying in the reformer 30.

<Operation of the Fuel Cell Power Generation System Immediately after an Exchange of the Adsorptive Desulfurization Section>

Now, a method for operating the fuel cell power generation system 100 after the adsorptive desulfurization section 5 is exchanged will be described.

As described above, the adsorptive removal agent used in the adsorptive desulfurization section 5 adsorbs a hydrocarbon component in the raw material in addition to the sulfur compound. Especially, the zeolite-based adsorptive removal agent used in this embodiment has a great tendency to adsorb a hydrocarbon-based raw material, and adsorbs a large amount of raw material in the state where the raw material starts passing the adsorptive desulfurization section (initial flowing period of the raw material). Therefore, during the operation immediately after the adsorptive desulfurization section 5 which has been passed by almost no raw material (fresh adsorptive desulfurization section) 5 is connected to the connection sections 7, a part of the hydrocarbon component in the raw material is adsorbed by the adsorptive desulfurization section 5. Where the fuel cell power generation system 100 is operated in this state, the amount of the hydrogen-containing gas generated in the reformer 30 is small and the amount of power generation is decreased due to the shortage of hydrogen. In the case where the hydrogen off-gas is used as a heating source of the reformer 30, the amount of heat necessary for the reforming reaction is not obtained. Thus, it becomes difficult to continue the normal operation of the fuel cell power generation system 100.

In this embodiment, during the time period in which the amount of the hydrocarbon component adsorbed by the adsorptive desulfurization section 5 is large, at least one of the behavior of the raw material supply section 4 and the behavior of the fuel cell 8 is controlled, such that the ratio of the flow rate of the raw material supplied to the adsorptive desulfurization section 5 and the amount of power generation is higher than the ratio of the raw material flow rate and the target value for the power generation before the adsorptive desulfurization section 5 is exchanged. Specifically, the fuel cell power generation system is operated at the flow rate or the amount of power generation corrected based on the adsorbing ratio of the adsorptive desulfurization section 5 on the hydrocarbon component.

Especially when the adsorptive desulfurization section 5 is exchanged for a new one, for example, when an exchange of the desulfurization section 5 is detected, the fuel cell power generation system can run stably by being operated in the above-described manner. An operation method usable when the adsorptive desulfurization section 5 is exchanged will be described more specifically. First, the maintenance worker or the like inputs an exchange signal through the input section 17 when exchanging the adsorptive desulfurization section 5. The input exchange signal is sent to the operating control section 16. Upon receiving the exchange signal, the operating control section 16 controls the behavior of the raw material supply section 4 to increase the raw material flow rate, or controls the output of the fuel cell 8 or the amount of electric current obtained from the fuel cell 8 to increase the ratio of the raw material flow rate and the target value for the power generation as compared to that before the exchange of the adsorptive desulfurization section 5. For example, the output of the fuel cell 8 is controlled by providing an upper limit on the amount of the electric current obtained from the fuel cell 8 and controlling the amount of the electric current so as not to exceed the upper limit. Controlling the amount of the electric current is controlling the moving amount of protons in the fuel cell 8, and so is controlling the amount of hydrogen consumed in the fuel cell 8. The amount of the electric current obtained from the fuel cell 8 approximately matches the amount of hydrogen consumed by the power generation performed by the fuel cell 8.

As a result, the amount of the raw material to be supplied can be larger than that in the case where the ratio of the raw material flow rate and the target value for the power generation is not changed after the exchange of the adsorptive desulfurization section 5. Therefore, a sufficient flow rate of raw material can be allowed to pass the adsorptive desulfurization section 5 and be supplied to the reformer 30. Thus, an amount of the hydrogen-containing gas necessary for the power generation operation of the fuel cell power generation system 100 can be obtained with certainty.

The fuel cell power generation system 100 in this embodiment also has the following advantages. The conventional fuel cell power generation system has a problem that when the composition of the raw material to be supplied to the reformer 30 is changed by the adsorption of the raw material as described above, the ratio of the carbon component in the raw material supplied to the reformer 30 and water supplied to the reformer 30 from the water supply section 3 (steam-to-carbon ratio) is deviated. Namely, when the hydrocarbon component in the raw material is adsorbed, the amount of the carbon component is decreased. Therefore, the steam-to-carbon ratio is increased, and as a result, the dew point of the hydrogen-containing gas supplied from the reformer 30 is raised. When the dew point of the gas is raised, the operation of the fuel cell power generation system may become unstable due to flooding in the gas flow path. By contrast, in this embodiment, the behavior of the raw material supply section 4 is controlled such that the ratio of the raw material flow rate with respect to the target value for the power generation is higher than the ratio which is set before the exchange of the adsorptive desulfurization section 5. Owing to this, the raw material of the flow rate which is necessary for the target amount of power generation is supplied to the reformer 30. Therefore, the deviation of the steam-to-carbon ratio can be corrected. In the case where the behavior of the raw material supply section 4 is controlled such that the ratio of the raw material flow rate with respect to the target value for the power generation is higher than the ratio which is set before the exchange of the adsorptive desulfurization section 5 in order to keep the steam-to-carbon ratio constant, it is preferable that the amount of water to be supplied to the reformer 30 is determined with respect to the raw material flow rate for the amount of power generation which is set before the exchange of the adsorptive desulfurization section 5.

This embodiment is especially advantageous when being applied to a fuel cell power generation system in which an upper limit is provided on the raw material flow rate for the amount of power to be generated by the fuel cell 8. In a conventional system in which an upper limit is provided on the raw material flow rate, the amount of the hydrocarbon component to be supplied to the adsorptive desulfurization section may undesirably exceed the amount of the hydrocarbon component contained in the raw material flow rate at the preset upper limit. For this reason, there is a problem that a decrease of the generation amount of the hydrogen-containing gas is decreased. Where this embodiment is applied to such a system, the upper limit on the raw material flow rate is corrected based on the adsorption characteristics of the adsorptive desulfurization section. Therefore, the shortage of the generation amount of the hydrogen-containing gas with respect to the target value for the power generation can be avoided more effectively.

For the fuel cell power generation system 100, it is preferable that the ratio of the raw material flow rate with respect to the target value for the power generation during the normal operation is preset. Considering the energy efficiency of the fuel cell power generation system, the above ratio is, in many cases, not a constant value for different amounts of power generation. For example, the energy efficiency is different for power generation of 1 kW and for power generation of 750 W even in the same fuel cell power generation system. Therefore, the ratio of the raw material flow rate with respect to the target value for the power generation is also different. In order to stabilize the operation of the fuel cell power generation system, it is preferable to set the raw material flow rate for each target value for the power generation in the operating control section 16 in advance. For example, a table showing that the raw material flow rate for the power generation of 1 kW is 4 NL/min. and that the raw material flow rate for the power generation of 750 W is 3.1 NL/min. can be set in the operating control section 16.

By contrast, it is preferable that the ratio of the target value for the power generation and the raw material flow rate after the exchange of the adsorptive desulfurization section 5 is determined in consideration of the adsorbing ratio of the adsorptive desulfurization section 5 on the hydrocarbon component, based on the ratio during the normal operation. In addition, it is preferable that the ratio is set based on the raw material flow rate in consideration of the amount of the hydrogen-containing gas which can be generated from the composition of the raw material. For realizing this, the adsorption characteristics, on the hydrocarbon component, of the adsorptive desulfurization section 5 to be used in the fuel cell power generation system needs to be found in advance.

In this embodiment, the adsorption characteristics of the adsorptive desulfurization section 5 is found by the measurement which is described above with reference to FIG. 1, and the ratio of the raw material flow rate and the target value for the power generation is set such that the amount of the raw material decreased by the raw material passing the adsorptive desulfurization section 5 is compensated for. A specific example will be described, hereinafter.

It is assumed that the adsorptive desulfurization section 5 during the operation before the exchange (during the normal operation), namely, the adsorptive desulfurization section 5 which adsorbs almost no hydrocarbon component in the raw material anymore, is connected to the connection sections 7. In this case, where the target value for the power generation is 1 kW and the raw material flow rate is 4 NL/min., the ratio of the raw material flow rate with respect to the target value for the power generation is 4 NL/(min·kW). At the point when, after the adsorptive desulfurization section 5 is exchanged, about 240 L of the raw material has passed the fresh adsorptive desulfurization section 5 (accumulated flow volume: about 240 L), it is necessary, based on the above-described measurement results, to increase the raw material flow rate by about 10% in order to obtain the hydrogen-containing gas required to generate 1 kW of power. Therefore, the above ratio is set to be 4.4 NL/(min·kW). In the above, an example of how to set the ratio of the raw material flow rate with respect to the target value for the power generation when the accumulated flow volume is about 240 L is described. Similarly, the ratio of the raw material flow rate with respect to the target value for the power generation immediately after the adsorptive desulfurization section 5 is exchanged, or when the accumulated flow volume is different from about 240 L, can also be appropriately set based on the measurement results of the amount of the raw material adsorbed by the adsorptive desulfurization section 5.

In this embodiment, there is no specific limitation on the zeolite-based adsorptive desulfurization agent contained in the adsorptive desulfurization section 5. The adsorption characteristics on the hydrocarbon component in the raw material vary in accordance with the type of the zeolite-based adsorptive desulfurization agent. Thus, when the adsorptive desulfurization section 5 with a different type of zeolite-based adsorptive desulfurization agent is to be used, it is preferable to measure the adsorption characteristics of the adsorptive desulfurization section 5 on the hydrocarbon component in advance by, for example, substantially the same method as described above and control the raw material flow rate, the output of the fuel cell 8 or the amount of the electric current obtained from the fuel cell 8 based on the obtained adsorption characteristics. It is advantageous to set the operating condition of the fuel cell power generation system immediately after the exchange of the adsorptive desulfurization section 5 for each adsorptive desulfurization agent to be used. The reason is that in this way, the amount of the hydrocarbon component adsorbed by the adsorptive desulfurization agent can be compensated for with more certainty.

In general, when an adsorbing agent adsorbs a certain amount of substance, the adsorption thereof is saturated. As shown in FIG. 1, the adsorptive desulfurization agent used in this embodiment shows substantially the same tendency. Therefore, the amount of the hydrocarbon component adsorbable by the adsorptive desulfurization agent is gradually saturated by causing a certain amount of raw material to pass the adsorbing agent. As a result, the shortage of the flow rate of the raw material which has passed the adsorptive desulfurization section 5 can be prevented. Namely, when the raw material is flown to the adsorptive desulfurization section 5 for a certain time period by operating the fuel cell power generation system 100 after the adsorptive desulfurization section 5 is exchanged, the flow rate of the raw material which has passed the adsorptive desulfurization section 5 can be stabilized. After the flow rate of the raw material which has passed the adsorptive desulfurization section 5 is stabilized, it is preferable that the ratio of the raw material flow rate with respect to the target value for the power generation is returned to the ratio before the exchange of the adsorptive desulfurization section 5. For example, the ratio can be decreased to the ratio before the exchange by appropriately adjusting the accumulated flow volume of the raw material to pass the adsorptive desulfurization section 5, the target value for the power generation by the fuel cell 8 correlated with the consumption amount of the raw material or the like. Any several target points may be set for the accumulated raw material flow rate, and the ratio may be decreased by a certain value each time such a target point is reached. Alternatively, the relationship between the accumulated raw material flow rate and the adsorption amount of the adsorptive desulfurization section 5 may be put into a function and the fuel cell power generation system 100 may be controlled such that the ratio is decreased based on the function. Since the accumulated raw material flow rate and the accumulated amount of power generated by the fuel cell 8 are correlated with each other, the accumulated raw material flow rate may be replaced with the accumulated amount of generated power in the above-described control method.

The flow rate of the raw material to be supplied to the adsorptive desulfurization section 5 can be found based on a power instruction value used for controlling the behavior of the raw material supply section 4, the accumulated amount of power generated by the fuel cell 8 or the like. Flow meters may be located inside and outside the fuel cell power generation system to measure the accumulated raw material flow rate. Although not shown, the accumulated flow volume of the raw material supplied to the adsorptive desulfurization section 5 is measured by, for example, an accumulated flow volume measuring section including a dry- or wet-type accumulated flow meter. The accumulated flow volume measuring section may be structured to calculate an accumulated flow volume based on the raw material flow rate and the operating time period. The raw material flow rate may be directly measured using a flow meter or estimated from an operation indication value (input power or input frequency) of the raw material supply section 4. When the accumulated amount of power generation or the accumulated raw material flow rate reaches a preset value, the ratio of the raw material flow rate and the target value for the power generation is returned to the ratio before the adsorptive desulfurization section 5 is exchanged. Thus, the system can be operated stably.

Figure 4:
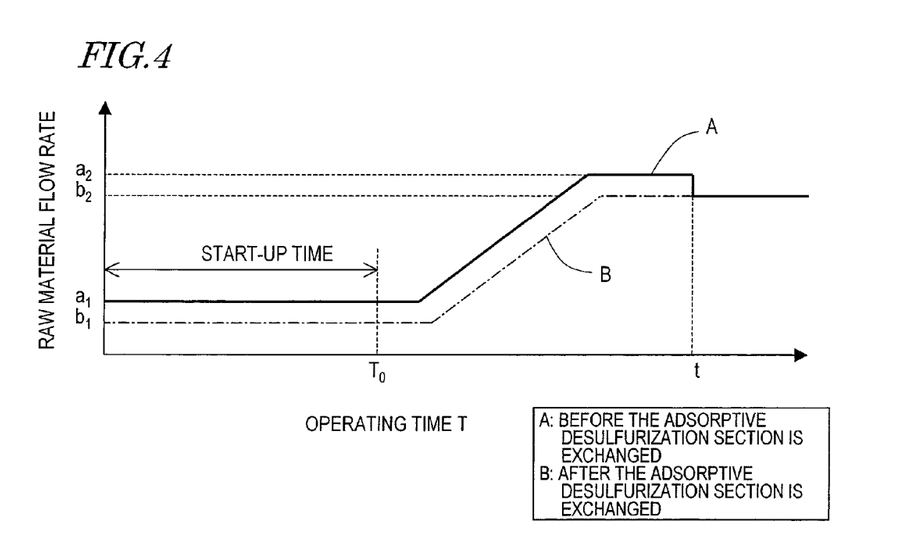
FIG. 4 is a schematic view of a control pattern on a raw material flow rate according to the present invention.

FIG. 4 is a graph showing an example of a control pattern on the raw material flow rate in the fuel cell power generation system in this embodiment. The horizontal axis represents the time from when the system starts to be operated (operating time) T, and the vertical axis represents the raw material flow rate. In FIG. 4, one-dot chain line B shows the time-wise change of the raw material flow rate when the system starts to be operated before the adsorptive desulfurization section is exchanged, namely, in the state where the adsorptive desulfurization section which has been passed by the raw material of the flow volume for saturation adsorption or larger is still installed. Solid line A shows the time-wise change of the raw material flow rate when the system starts to be operated for the first time after the adsorptive desulfurization section is exchanged.

Before the adsorptive desulfurization section is exchanged (in the normal state), as represented by the one-dot chain line B, during a time period after the operation is started until a prescribed power (for example, 300 W) is output ($0 \leq T < T_0$; hereinafter, referred to as a "start-up time"), the raw material flow rate is suppressed to b1 in order to adjust the temperature rise of the reformer. When the prescribed power is output ($T \geq T_0$), the raw material flow rate is increased to b2, which is necessary to obtain the target value for the power generation (for example, 1 kW). With the one-dot chain line B, the raw material flow rates during the start-up time and after the start-up are generally constant at b1 and b2, respectively. In actuality, there are occasions where the raw material flow rates are not constant because more complicated control is executed.

By contrast, during the operation immediately after the adsorptive desulfurization section is exchanged, as understood from the solid line A, during a certain time period after the system starts to be operated ($0 \leq T \leq t$), raw material flow rates a1 and a2 are controlled to be higher than the raw material flow rates b1 and b2 in the normal state represented by the one-dot chain line B (a1>b1; a2>b2). After the certain time period, the raw material flow rates are returned to the raw material flow rates in the normal state. In this example, when the operating time is T=t, the raw material flow rate is decreased to the raw material flow rate b2 in the normal state in one step, but may be decreased step by step.

As described above, in the normal state, the raw material flow rates b1 and b2 are controlled in accordance with the target value for the power generation. After the adsorptive desulfurization section is exchanged, the raw material flow rate is temporarily increased based on the flow rate in the normal state (hereinafter, also referred to as a "normal state raw material flow rate"). As a result, after the adsorptive desulfurization section is exchanged, the ratio of the raw material flow rate with respect to the target value for the power generation becomes higher than the ratio in the normal state. The normal state raw material flow rate does not need to be constant with respect to the target value for the power generation.

FIG. 4 shows an example in which the raw material flow rate is controlled in order to adjust the ratio of the raw material flow rate with respect to the target value for the power generation. In addition to, or instead of, the raw material flow rate, the target value for the power generation may be controlled. In this case, the target value for the power generation may be set to be lower than the target value in the normal state for a certain time period after the start of the operation ($0 \leq T < t$), and may be returned to the target value for the generation in the normal state after the certain time period passes.

Figure 5:
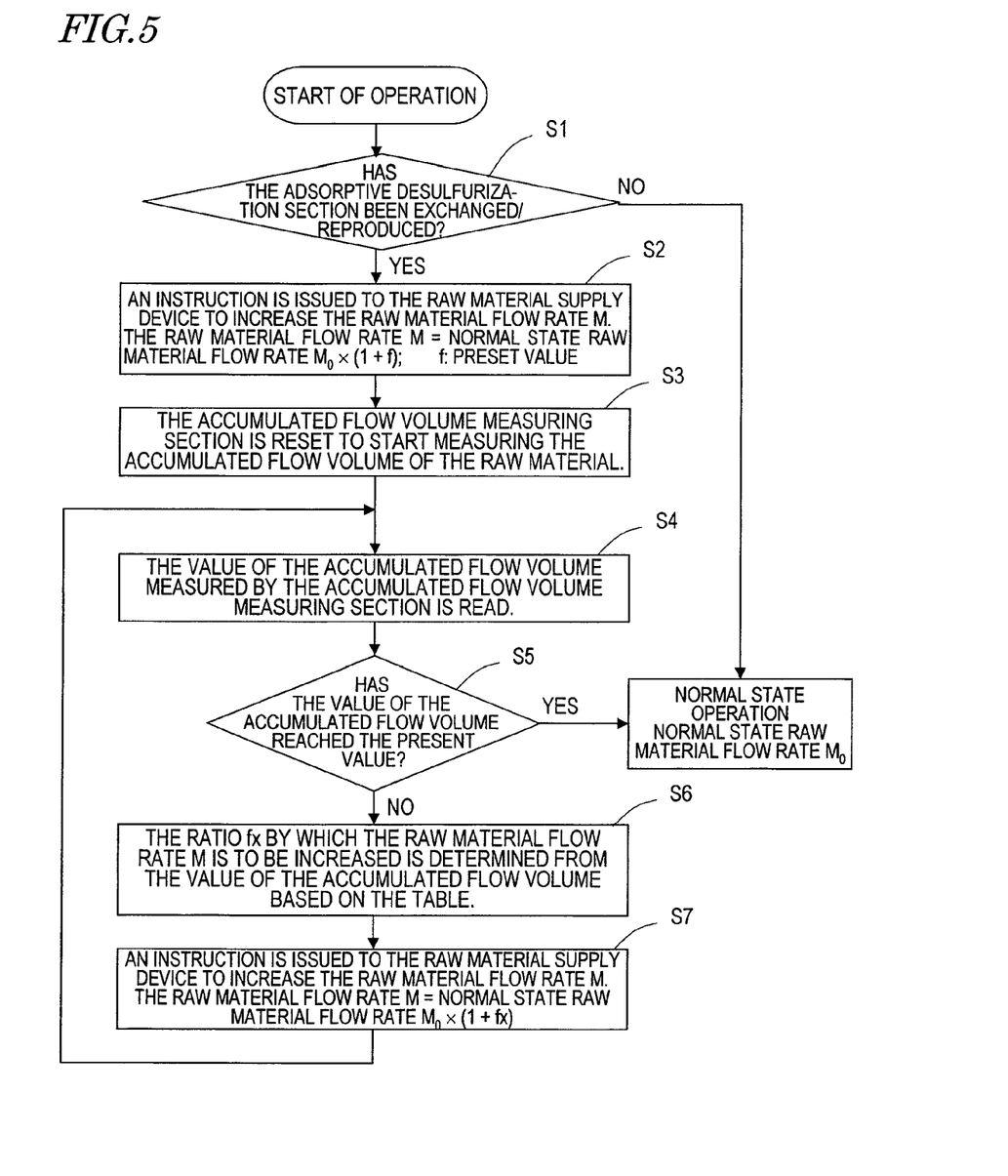
FIG. 5 is a flowchart of a control program executed by an operating control section in Embodiment 1 according to the present invention.

Now, a control program executed by the operating control section will be described specifically. FIG. 5 is a flowchart showing an example of the control program. In this example, an instruction is issued to the raw material supply section to control the raw material flow rate, and thus the ratio of the raw material flow with respect to the target value for the power generation is adjusted.

Before staring the operation, the operating control section first detects whether or not the adsorptive desulfurization section has been exchanged (step S1). When it is detected that the adsorptive desulfurization section has not been exchanged, the operating control section executes the control for the normal state. By contrast, when it is detected that the adsorptive desulfurization section has been exchanged, the operating control section issues an instruction to the raw material supply section to increase the raw material flow rate at a preset ratio f (step S2). The raw material flow rate at this point is: the raw material flow rate in the normal state (normal state raw material flow rate)×(1+f). Next, the accumulated flow volume measuring section located, for example, upstream with respect to the adsorptive desulfurization section is reset and caused to start measuring the accumulated flow volume of the raw material supplied to the adsorptive desulfurization section (step S3). Step S3 may be performed before step S2 or concurrently with step S2. Next, the value of the accumulated flow volume measured by the accumulated flow volume measuring section is read (step S4). Herein, step S4 is executed, for example, every 5 minutes, and it is determined each time whether or not the value of the accumulated flow volume read in step S4 has reached a preset value (step S5). When the read value has not reached the preset value, the increasing amount ratio fx of the raw material flow rate with respect to the normal state raw material flow rate is determined based on the read value of the accumulated flow volume (step S6), and an instruction is issued to the raw material supply section to increase the raw material flow rate (step S7). The raw material flow rate at this point is: the normal state raw material flow rate×(1+fx). Then, step S4 is executed again. Thus, steps S4 through S7 are repeated until it is determined in step S5 that the value of the accumulated flow volume has reached the present value. When it is determined in step S5 that the value of the accumulated flow volume has reached the present value, an instruction is issued to the raw material supply section to return the raw material flow rate to the normal state raw material flow rate.

In the above-described control program, the value of the accumulated flow volume is read at prescribed timings and the increasing amount ratio of the raw material flow rate is updated based on the read value. Therefore, the amount of the hydrocarbon component adsorbed by the adsorptive desulfurization section can be compensated for efficiently and certainly. The control program in this embodiment is not limited to being executed in accordance with the flowchart shown in the figure. As described above, instead of issuing an instruction to the raw material supply section 4 for controlling the raw material flow rate, an instruction may be issued to the fuel cell for controlling the amount of power generation.

The fuel cell power generation system in this embodiment is preferably usable as a home-use power generation system. In this case, in order to efficiently provide a part of the power consumed in the household, the amount of power generation may be varied in accordance with the time slot in a day. Hereinafter, an example of a control pattern for the power generation will be described with reference to the figure.

Figure 6:
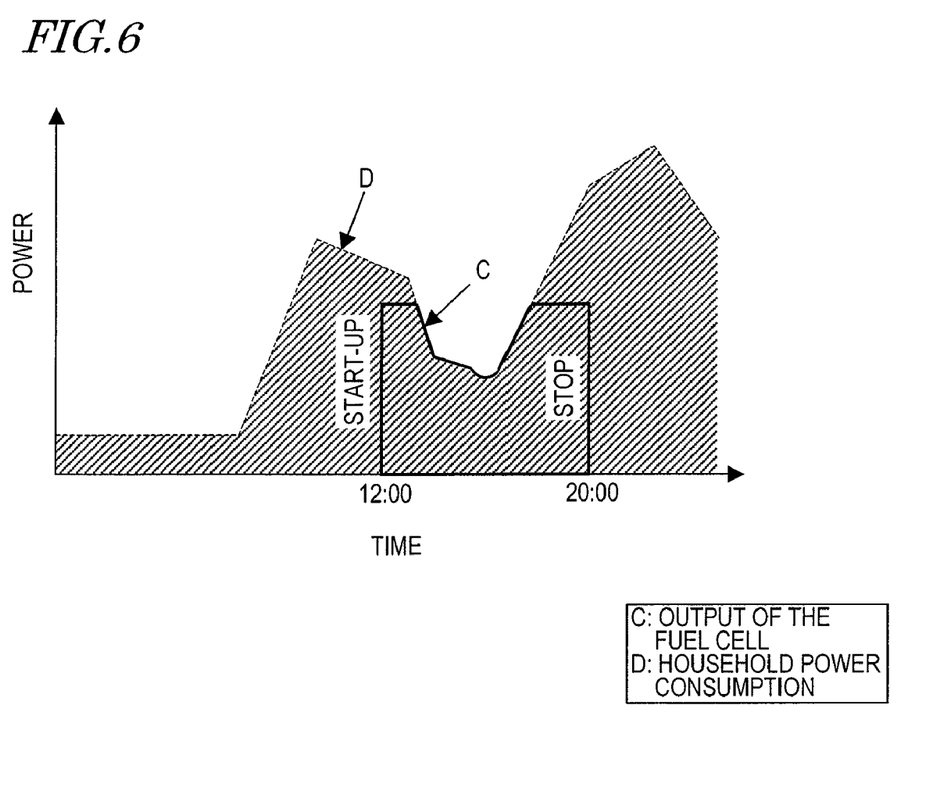
FIG. 6 is a graph showing an example of a control pattern on power generation output.

In FIG. 6, line D shows an example of a change of the power consumption of one day in a household. The horizontal axis represents the time, and the vertical axis represents the power consumption. Line C shows an example of a control pattern on the power generation output after the home-use fuel cell power generation system is started up. The horizontal axis represents the time, and the vertical axis represents the power generation output. In this example, the power generation output (line C) is set to efficiently provide a part of the power to be consumed in the household (line D).

In order to change the power generation output as represented by the line C, the raw material flow rate (normal state raw material flow rate) may be changed in accordance with the power to be output in conformity with a predefined program. In this case also, after an exchange signal regarding the adsorptive desulfurization section 5 is detected, the raw material flow rate is temporarily increased based on the normal state raw material flow rate which is changed based on the program. Owing to this, even immediately after the adsorptive desulfurization section 5 is exchanged, a desired power generation output can be obtained.

The fuel cell power generation system according to the present invention is not limited to having the above-described structure (FIG. 1). With the structure shown in FIG. 1, an exchange of the adsorptive desulfurization section 5 is detected by an exchange signal input through the input section 17. The exchange of the adsorptive desulfurization section 5 can also be detected by other means. For example, the connection sections 7 may be provided with a desulfurization section exchange detection section for detecting an exchange of the adsorptive desulfurization section 5 by a mechanical contact switch, or with a desulfurization section exchange detection section for detecting an exchange of the adsorptive desulfurization section 5 using an IC tag or the like.

In this embodiment, one detachable adsorptive desulfurization section 5 is used. Alternatively, a plurality of adsorptive desulfurization sections located in series or in parallel may be used. In this case, it is sufficient that at least one of the plurality of adsorptive desulfurization sections has a detachable structure.

For operating the fuel cell power generation system, it is advantageous to correct the raw material flow rate or the target value for the power generation based on the adsorbing ratio of the adsorptive desulfurization section on the hydrocarbon component, for exchanging the adsorptive desulfurization section for a new one and also for regenerating a used adsorptive desulfurization section inside or outside the fuel cell power generation system. The reason is that the above correction can be performed in accordance with the adsorption characteristics of the regenerated adsorptive desulfurization section. In addition, when an adsorptive desulfurization section which has been passed by a certain amount of raw material is set in a connection section, for example, when an adsorptive desulfurization section which is once detached is set again in the connection section, proper correction can be made based on the adsorbing ratio of the adsorptive desulfurization section at the time of setting.

INDUSTRIAL APPLICABILITY

The present invention is useful for a fuel cell power generation system including an adsorptive desulfurization section for adsorbing a sulfur compound in a raw material and a reformer for generating hydrogen-containing gas by a reforming reaction of the raw material and water, and a method for operating the same.

The invention claimed is:

1. A method for operating a fuel cell power generation system, the method comprising the steps of:
    introducing a hydrocarbon-based raw material containing a sulfur component into an adsorptive desulfurization section for adsorbing the sulfur component in the raw material,
    generating hydrogen-containing gas by a reforming reaction of the raw material which has passed the adsorptive desulfurization section and water, and
    performing power generation in a fuel cell using the hydrogen-containing gas as a fuel,
    wherein, when an adsorbing ratio of the adsorptive desulfurization section on a hydrocarbon component has a first value, a ratio of the flow rate of the raw material to be supplied to the adsorptive desulfurization section with respect to a target value for power generation by the fuel cell is higher than that when the adsorbing ratio has a second value which is less than the first value.

2. A method for operating a fuel cell power generation system of claim 1, wherein, when the adsorbing ratio of the adsorptive desulfurization section on a hydrocarbon component has the first value, the flow rate of the raw material to be supplied to the adsorptive desulfurization section is made greater than that when the adsorbing ratio has the second value.

3. A method for operating a fuel cell power generation system of claim 1, wherein, when the adsorbing ratio of the adsorptive desulfurization section on a hydrocarbon component has the first value, a power generated by the fuel cell is made lower than that when the adsorbing ratio has the second value.

4. A method for operating a fuel cell power generation system of claim 1, wherein, after the adsorptive desulfurization section is exchanged, the ratio of the flow rate of the raw material to be supplied to the adsorptive desulfurization section with respect to the target value for power generation by the fuel cell is higher than the ratio before the exchange.

5. A method for operating a fuel cell power generation system of claim 1, further comprising steps of:
    measuring an accumulated flow volume of the raw material supplied to the adsorptive desulfurization section after the adsorptive desulfurization section is exchanged, and
    when the accumulated flow volume increases, controlling at least one of the flow rate of the raw material to be supplied to the adsorptive desulfurization section and the power generation amount by the fuel cell, such that the ratio of the flow rate of the raw material to be supplied to the adsorptive desulfurization section with respect to the target value for the power generation is returned to the ratio before the exchange.

6. A method for operating a fuel cell power generation system of claim 1, further comprising steps of:
    measuring an accumulated power generation amount by the fuel cell after the adsorptive desulfurization section is exchanged, and
    when the accumulated power generation amount increases, controlling at least one of the flow rate of the raw material to be supplied to the adsorptive desulfurization section and the power generation amount by the fuel cell, such that the ratio of the flow rate of the raw material to be supplied to the adsorptive desulfurization section with respect to the target value for the power generation is returned to the ratio before the exchange.

7. A method for operating a fuel cell power generation system of claim 5, wherein, when the accumulated flow volume reaches a preset level determined based on a flow volume of the raw material which is necessary to saturate an adsorption amount of the adsorptive desulfurization section on hydrocarbon, at least one of the flow rate of the raw material to be supplied to the adsorptive desulfurization section and the power generation amount by the fuel cell is controlled, such that the ratio of the flow rate of the raw material to be supplied to the adsorptive desulfurization section with respect to the target value for the power generation is returned to the ratio before the exchange.

8. A method for operating a fuel cell power generation system of claim 1, wherein the flow rate of the raw material to be supplied to the adsorptive desulfurization section after the adsorptive desulfurization section is exchanged is increased as compared with the flow rate before the exchange, the flow rate to be increased being determined based on an adsorption characteristics of the adsorptive desulfurization section on a hydrocarbon component and the accumulated flow volume of the raw material.

9. A method for operating a fuel cell power generation system of claim 1, wherein, in accordance with a predefined program after the fuel cell power generation system starts its start-up process, the flow rate of the raw material to be supplied to the adsorptive desulfurization section after the adsorptive desulfurization section is exchanged is increased as compared with the flow rate before the exchange.

10. A method for operating a fuel cell power generation system of claim 1, wherein, after the adsorptive desulfurization section is exchanged, a target value for power generation by the fuel cell is made lower than the target value before the exchange.

11. A method for operating a fuel cell power generation system of claim 1, further comprising a step of:
    returning the ratio of the flow rate of the raw material to be supplied to the adsorptive desulfurization section with respect to the target value for the power generation after an exchange of the adsorptive desulfurization section to the ratio before the exchange step by step.

12. A method for operating a fuel cell power generation system of claim 1, wherein the adsorptive desulfurization section has an adsorptive removal agent containing zeolite as a main component.

* * * * *